US008565487B2

(12) United States Patent
Kuniz et al.

(10) Patent No.: US 8,565,487 B2
(45) Date of Patent: Oct. 22, 2013

(54) METHOD AND SYSTEM FOR MEASURING MOTION

(75) Inventors: Ziv Kuniz, Natanya (IL); Giora Ein-Zvi, Bat-hefer (IL); Avraham Feazadeh, Natanya (IL); Motti Haridim, Givat Zeev (IL)

(73) Assignee: MediTouch Ltd., Netanya, IL (US)

( * ) Notice: Subject to any disclaimer, the term of this patent is extended or adjusted under 35 U.S.C. 154(b) by 1229 days.

(21) Appl. No.: 12/026,636

(22) Filed: Feb. 6, 2008

(65) Prior Publication Data

US 2009/0196463 A1 Aug. 6, 2009

(51) Int. Cl.
*G06K 9/00* (2006.01)
*G01J 1/42* (2006.01)

(52) U.S. Cl.
USPC .......................................... 382/106; 356/228

(58) Field of Classification Search
USPC ........................................................ 382/103
See application file for complete search history.

(56) References Cited

U.S. PATENT DOCUMENTS

| 6,008,800 | A | * | 12/1999 | Pryor | 345/173 |
|---|---|---|---|---|---|
| 2003/0039388 | A1 | * | 2/2003 | Ulrich et al. | 382/145 |
| 2003/0063292 | A1 | * | 4/2003 | Mostafavi | 356/614 |
| 2004/0170315 | A1 | * | 9/2004 | Kosaka et al. | 382/154 |
| 2005/0276448 | A1 | * | 12/2005 | Pryor | 382/103 |
| 2006/0129070 | A1 | * | 6/2006 | Pearl et al. | 600/595 |
| 2006/0182326 | A1 | * | 8/2006 | Schildkraut et al. | 382/132 |
| 2007/0252813 | A1 | | 11/2007 | Liberty et al. | |

FOREIGN PATENT DOCUMENTS

| GB | 2 413 235 A | * | 10/2005 |
|---|---|---|---|
| WO | 01/79794 A1 | | 10/2001 |
| WO | 2006/119186 A2 | | 11/2006 |

* cited by examiner

Primary Examiner — Alex Liew
(74) Attorney, Agent, or Firm — Oren Reches

(57) ABSTRACT

A system for determining a kinetic parameter of an object, the system includes: (a) a target, that includes a calibration facilitating pattern and which is connected to the object, so that a movement of the target correlates with a movement of the object; (b) an optical source, which is adapted to illuminate the target; (c) an optical sensor, adapted to generate detection signals in response to light received from the target; and (d) a processor, adapted to determine a calibration parameter and the kinetic parameter in response to the detection signals and to detection signals reference information.

11 Claims, 12 Drawing Sheets

410

420

430

440

METHOD AND SYSTEM FOR MEASURING MOTION

FIELD OF THE INVENTION

The invention relates to methods and systems for measuring motion.

BACKGROUND OF THE INVENTION

Measuring of a kinetic parameter that conveniently pertains to a motion of an object, is desirable in many fields.

Prior art solutions, such as optical navigation sensors, are limited to measure solely the differential movements of the object and are not capable of measuring the absolute location of the object, due to the accumulative measurement errors. In fact, in these systems/applications no measures are undertaken for compensating the measurement error (as actually it is not needed in the relevant applications) and calibration of the system during the course of a measurement cycle. Those systems/applications which do implement some forms of compensating for measurement errors usually implement costly solutions, which are not economical in many aspects and for many utilizations. There is a need, however, for reliable and simple means which takes into account measurement errors and thus allow for real time quick self-calibration of the measuring routine, so that the absolute position of the object can be accurately determined.

Accurate measurements of the position of objects are required in many innovative systems and applications such as virtual reality, robotics, game industry, computer accessory, medical and industrial devices. The capability of detecting the accurate location and velocity of various objects is of crucial importance for appropriate functioning of such systems. The current methods for position measurements include Hall Effect, optical fibers, strain gauge and resistance sensors. These methods suffer either from limited dynamic range, and/or accumulative measurement errors, and/or low accuracy, and/or high cost, and/or high volume/weight, and/or low reliability, and/or poor reproducibility.

In the medical field, measurement of one or more kinetic parameters is required for the recognition, identification and treatment in certain physiological phenomena or diseases.

For example, different sorts of tremor—an unintentional oscillatory muscle movement of one or more parts of the body—are better recognized, identified and treated by an accurate measurement of the kinetic parameters of the tremor. It is noted that the common tremors affect the hands, arms, head, face, torso, and legs, from which the most common is the hand tremor.

There is therefore a need to develop reliable and simple means of measuring motion, and there is also a need to develop reliable and simple means of measuring motion of an organ of a subject.

SUMMARY OF THE INVENTION

A system for determining a kinetic parameter of an object, the system includes: (a) a target, that includes a calibration facilitating pattern and which is connected to the object, so that a movement of the target correlates with a movement of the object; (b) an optical source, which is adapted to illuminate the target; (c) an optical sensor, adapted to generate detection signals in response to light received from the target; and (d) a processor, adapted to determine a calibration parameter and the kinetic parameter in response to the detection signals and to detection signals reference information.

A method for determining a kinetic parameter of an object, the method includes: (a) illuminating a target, which comprises a calibration facilitating pattern and which is connected to the object, so that a movement of the target correlates with a movement of the object; (b) generating detection signals in response to light received from the target; and (c) determining a calibration parameter and the kinetic parameter in response to the detection signals and to detection signals reference information.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which.

DETAILED DESCRIPTION OF THE DRAWINGS

Figure 1A:
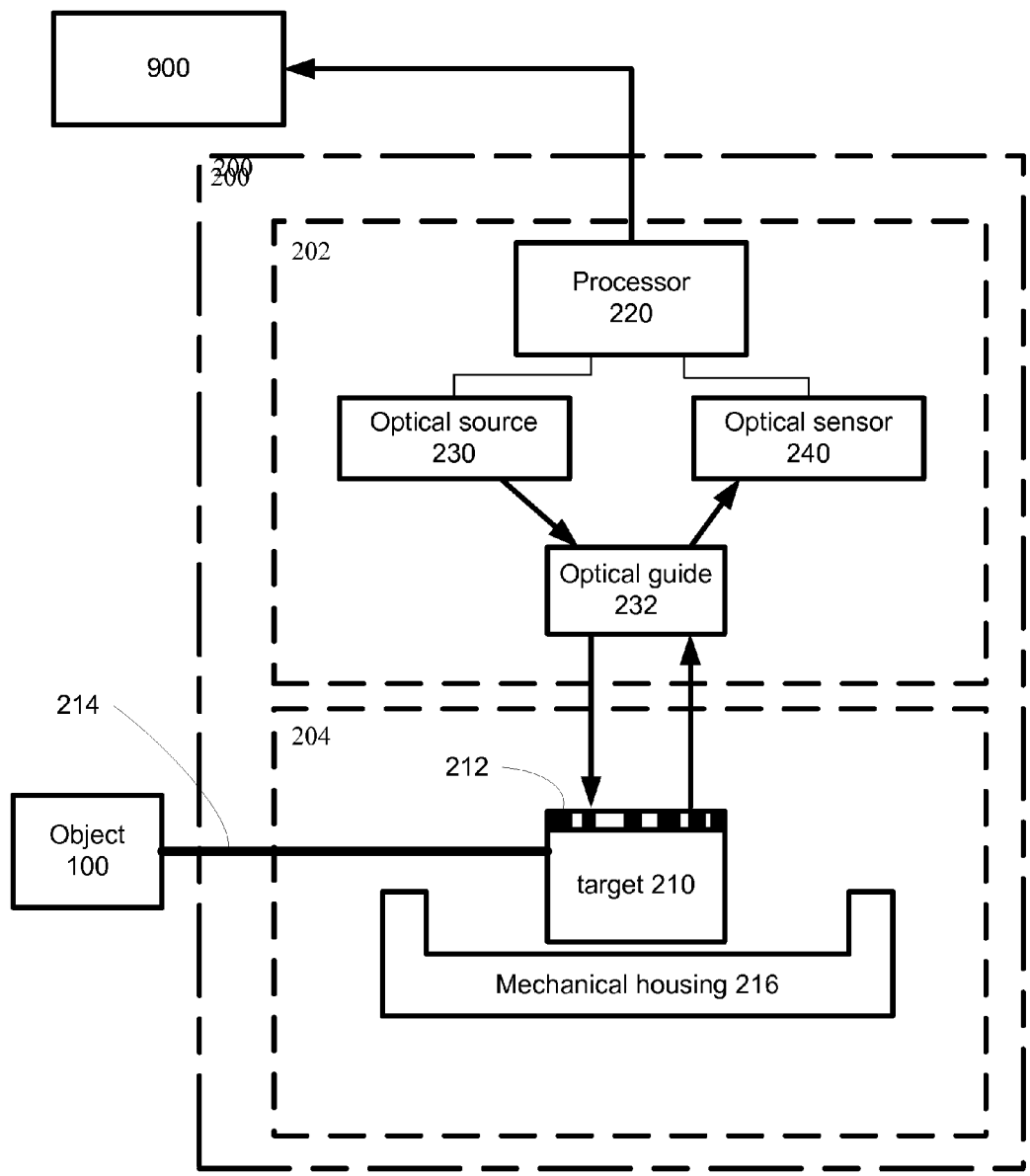
FIG. 1a is a block diagram of a system, which is adapted to determine a kinetic parameter of an object, according to an embodiment of the invention.

FIG. 1 is a block diagram of system 200, which is adapted to determine a kinetic parameter of object 100, according to an embodiment of the invention. System 200 includes target 210, which includes calibration facilitating pattern 212, wherein target 200 is connected to object 100 so that a movement of target 210 correlates with a movement of object 100.

Calibration facilitating pattern 212 conveniently includes multiple segments, so that when provided with detection signals responsive to calibration facilitating target 212, processor 220 can carry out both determining of the kinetic parameter and calibration of the measurement, by determining one or more calibration parameters.

It is noted that conveniently target 210 is connected to object 100 by mechanical connection 214, which includes, according to some different embodiments of the invention, strings, bearings, and some plastic elements that are responsible for transferring any motion of object 100 to target 210. It is noted that mechanical connection 214 facilitates a connecting of a remote object 100 to target 210, and that the distance between object 100 and target 210 differ between different embodiment of the invention.

It is noted that system 200 can conveniently be arbitrarily far from object 100, which is facilitated by the use of one or more mechanical connections 214 such as strings routed via tracks of springs or flexible pipes.

Target 210 is conveniently assembled in mechanical assembly 216, which includes, according to an embodiment of the invention, a well defined track which is adapted to confine the movement of target 210 to a predefined course. The motion of object 100, which is transferred via mechanical connection 214 to target 210, thus results in a motion of calibration facilitating pattern 212 which corresponds to the motion of object 100.

System 200 further includes optical source 230, which is adapted to illuminate target 210 and thence to illuminate at least a portion of calibration facilitating pattern 212; and optical sensor 240 that is adapted to generate detection signals in response to light received from the target. It is noted that at least a portion of the light received from target 210 (on conveniently all said received light) is light projected onto target 210 by optical source 230 and reflected from calibration facilitating pattern 212. Conveniently, calibration facilitating pattern 212 is covered so as to be kept dark except when illuminated by optical source 230. This is achieved, according to an embodiment of the invention, by external cover 250 or by top cover 258, which are illustrated in FIG. 3d.

It is noted that according to an embodiment of the invention, optical sensor 240 and/or other components of system 200 are low cost devices (which are typically non-accurate devices), wherein according to the teachings of the invention these are used to make accurate determinations and measurements, which is facilitated by the on line self calibration. This eliminates the need for more accurate, hence expensive, components that are put to use in prior art solutions in order to gain accuracy.

It is further noted that conveniently, the illumination of optical source 230 is sufficient for the generating of detection signals responsive to the light reflected from calibration facilitating pattern 212 to a degree which facilitate the determining of processor 220, discussed below. Conveniently, optical sensor 240 is adapted to generate a series of consecutive images of an area which includes at least a portion of calibration facilitating pattern 212, and to provide the consecutive images to processor 220.

According to an embodiment of the invention, optical source 230 is adapted to project a laser beam onto target 210. According to an embodiment of the invention, optical source 230 is a light emitting diode (LED). It will be clear to a person skilled in the art that other types of optical sources 230 could be implemented as well in other embodiments of the invention. It is noted that, according to an embodiment of the invention, at least a portion of the illumination of optical source 230 and/or of the light received from target 210 by optical sensor 240 is guided by at least one optical guide 232. It is noted that conveniently, at least one optical guide 232 facilitates the keeping of target 210 (and especially of calibration facilitating pattern 212) in dark, except when illuminated by optical source 230.

According to an embodiment of the invention, optical sensor 240 is a charge coupled device (CCD) or a suitable photodiode. According to an embodiment of the invention, optical guide 232 includes optical components such as a converging lens. Conveniently, all the optical components are adapted for a specific spectral range, e.g. a portion of the infrared spectrum.

Processor 220, also included in system 200, is adapted to determine a calibration parameter and a kinetic parameter in response to the detection signals and to detection signals reference information, wherein conveniently, the determining of the kinetic parameter is responsive to the determined calibration parameter. Conveniently, the detection signal reference information includes information of calibration facilitating pattern 212. It is further noted that, conveniently, processor 220 is adapted to determine the calibration parameter and the kinetic parameter in multiple instances over a span of a measurement.

Conveniently, by comparing a series of images acquired by optical sensor 240 (which are, according to an embodiment of the invention, processed by at least one of optical sensor 240 and processor 220) to the detection signals reference information, processor 220 is adapted to determine the calibration parameter.

According to an embodiment of the invention, calibration facilitating pattern 212 includes multiple differently colored segments of different dimensions (such as width, area, and so forth), wherein the differently colored segments reflect illumination differently, either by the amount of light reflected, or by having different reflection characteristics in any other way. The motion of object 100 that is transferred to target 210 results in a movement of calibration facilitation pattern 212, and thus to a shifting in locations of boundaries between the multiple differently colored segments.

Conveniently, the multiple differently colored segments are designed so that the shifting of the boundaries, when processed by processor 220, suffices to determine the kinetic parameter and the calibration parameter. That is, the determining of the processor is conveniently responsive to the dimensions of the differently colored segments, in such as embodiment of the invention.

It is noted that conveniently, the differently colored segments are designed to sufficiently differ from each other, so that the difference between different segments (e.g. adjacent differently colored segments) when processed by optical sensor 240 is greater than a measuring error of optical sensor 240.

It is noted that in different embodiments of the invention, different calibration facilitating patterns 212 are implement, some of which include differentiation of the pattern over more than a single axis (example for which was offered above). According to an embodiment of the invention, calibration facilitating pattern 212 includes segments of similar (or identical) dimensions, but of three or more colors, wherein an order of the colored segments facilitates the determining of the calibration parameter.

It is noted that different kinetic parameters could be determined by processor 220, and that, according to an embodiment of the invention, processor 220 is adapted to determine multiple kinetic parameters. Such kinetic parameters include, for example, a location of object 100, a velocity of object 100, a direction of the movement of object 100, a velocity of object 100 along an axis (which may be defined in relation to object 100, to system 200, or to another object), among other parameters familiar to a person skilled in the art.

It is noted that in systems which determine a kinetic parameter of an object in response to a shifting of a target (such systems are, for example, optical navigation systems, inertial navigation systems, etc.); it is common for accumulative errors to accrue during a span of the measurement. System 200 is adapted to compensate for such accumulative errors by the inclusion of calibration facilitating pattern 212 that facilitates the determining of one or more calibration parameters by processor 220. According to an embodiment of the invention, the calibration parameter is a measure of the accumulative error, which accrued during a span of the measurement.

It is noted that, according to an embodiment of the invention, system 200 is adapted to be resetted before the measuring is initiated, wherein the calibration parameter is conveniently zeroized, wherein the accumulated error is determined from the zeroizing onwards.

It is noted that however, conveniently no zeroizing of system 200 is needed, due to the self calibration technique that removes the need for any kind of reset or zeroing. These features conveniently allow any user, including those suffering from some level of disability, to operate system 200 independently.

Conveniently, processor 220 is connected to optical sensor 240, wherein optical sensor 240 is adapted to provide to processor 220 the detection signals. It is noted that, according to an embodiment of the invention, optical sensor 240 is further adapted to apply at least one image processing process to the patterned illumination, wherein the detection signals provided to processor 220 are a result of the at least one image processing process.

Conveniently, processor 220 is adapted to compare between successive captured images (or other detection signals responsive to the light received by optical sensor 240 from target 210) that are captured by optical sensor 240, and hence is capable of detecting and quantifying any movement of calibration facilitating pattern 212 and consequently of object 100.

It is clear to a person skilled in the art that different kinetic parameters may be determined from such a comparison of the successive captured image. However, such a process inherently involves errors and inaccuracies, which typically accumulate over the span of a measurement. In order to determine a location of object 100, for example, the determining needs to be responsive to one or more calibration parameters which are conveniently measures of accumulated error. The determining of the calibration parameter is conveniently facilitated by a comparison between the captured images and detection signals reference information (e.g. predefined values of a calibration module), that is conveniently stored in a database (not shown) to which processor 220 is connected.

According to an embodiment of the invention, processor 220 is connected to optical source 230, and is adapted to control the illuminating of target 210 by optical source 230. It is noted that, for the clarity of the explanation, system 200 could be referred to as including two subsystem, mechanical assembly 204 which includes target 210, and conveniently also the aforementioned mechanical housing 216 and mechanical connection 214; and optical assembly 202 which includes the optical components, and can also be considered as including processor 220. It is noted that, according to an embodiment of the invention, mechanical assembly 204 and/or optical assembly 202 are integrated in a housing, adapted to support the corresponding assembly as a stand alone unit.

According to an embodiment of the invention, system 200 is adapted to determine a kinetic parameter of an organ of a subject, which is usually a human patient. Different physiological phenomena, such as different types of tremor, involve movement (either voluntary or involuntary), such as trembling. The determination of kinetic parameters pertaining to movements caused by such physiological phenomena may facilitate the recognition, identification and/or treatment of such physiological phenomena or diseases.

For example, different sorts of tremor (an unintentional oscillatory muscle movement of one or more parts of the body) are better recognized, identified and treated by an accurate measurement of the kinetic parameters of the tremor. It is noted that the common tremors affect the hands, arms, head, face, torso, and legs, from which the most common is the hand tremor. According to an embodiment of the invention, object 100 is a finger of the patient. It is noted that system 200 can be used to measure both intentional and unintentional movement of one or more organs of the patient, and that such intentional and unintentional movements can occur (and thus also measured) simultaneously.

According to an embodiment of the invention, at least some of the components of system 200 are connected to (or are part of) a wearable gear, adapted to be worn by the subject. Specifically, according to an embodiment of the invention, at least some of the components of system 200 are connected to (or are part of) a glove. According to an embodiment of the invention, at least some of the components of system 200 are connected to (or are part of) a gear adapted to be worn on an upper arm of the patient, wherein one or more mechanical connections 214 is adapted to transfer the motion of one or more fingers of the patient, wherein the patient is provided with one or more finger gears, connected to the one or more mechanical connections 214.

According to an embodiment of the invention, system 200 includes a data-sleeve (or other wearable gear) used for precise measurement of the motions of the body parts such as the neck, or feet.

According to an embodiment of the invention, system 200 further includes a retractor (not shown), that is adapted to retract target 210. The retractor can conveniently either retract target 210 to a starting position, or just apply a force countering a force applied by object 100. It is noted that in such an embodiment of the invention, processor 220 is conveniently adapted to take into account the force applied by the retractor during a determination of one or more of the parameters.

It is clear to a person skilled in the art that target 210 could be implemented in various ways. According to an embodiment of the invention, target 210 is a rotating target. Conveniently, rotating target 210 is adapted to be rotated continuously (e.g. having a shape of a wheel, or a rotatable drum), and so to facilitate measuring a motion of object 100 over a relatively long distance, while the size of target 210 is relatively small. According to such an embodiment of the invention, calibration facilitating pattern 212 is conveniently a cyclic pattern, i.e. covering an entire perimeter of the rotating target 210. It is noted that an example of a cyclic calibration facilitating pattern is illustrated in FIG. [2b] 2B.

It is noted that in such an embodiment of the invention, a linear (translational) motion of object 100 is conveniently converted into a circular motion of the rotating target 212. It is clear to any person skilled in the art that as processor 220 is conveniently provided with two-dimensional images from optical sensor 240, the different parameters are determinable from the two dimensional representation of the curved (e.g. round) target 210.

Conveniently, optical sensor 240 acts as linear sensor in the sense that it interprets linear and circular pattern in exactly the same manner. Therefore, calibration facilitating pattern 212 of the curved target 210 is conveniently sensed by optical sensor 240 linearly during the generation of the detection signals in response to light received from the target 210. It is noted that, conveniently, calibration facilitating pattern 212 of the curved target 210 is designed to facilitate such generation of the detection signals.

According to an embodiment of the invention, the two dimensional nature of the image is used for measuring two orthogonal motions; for example, in the case of a linear calibration facilitating pattern 212, both x and y displacements are measured, wherein the same can be applied to the curved pattern.

According to an embodiment of the invention, target 210 is a sliding target that is adapted to slide along a well defined track. Conveniently, the track facilitates linear sliding of sliding target 210, though sliding along a curved track is implemented in some embodiments of the invention. According to an embodiment of the invention, target 210 is a piston, which is conveniently adapted to extend and retract over a predetermined track.

It is noted that, According to an embodiment of the invention, processor 220 is a processor of a system such as a computer, wherein optical sensor 240 is adapted to provide the detection signals to processor 220 via an interface of said system, which is conventionally a standard interface (like a universal serial bus and the like). It is noted that according to different embodiments of the invention, optical sensor 240 is adapted to provide the detection signals over either a wireless or a wired channel.

According to an embodiment of the invention, processor 220 is adapted to provide the kinetic parameter to external system 900, such as a personal computer, a personal digital assistant, a cellular phone, and so forth. It is noted that, conveniently, external system 900 is adapted to display, to record or to otherwise use the kinetic parameter (and, according to an embodiment of the invention, also the calibration parameter) in a continuous fashion, continuously using updated values of the one or more parameters received from system 200. According to different embodiments of the invention, the connection between system 200 and external system 900 is wireless, wired, or a combination thereof.

It should be noted that, according to an embodiment of the invention, target 210 is attached to object 100. For example, system 200 may include a glove or other gear worn on the hand (or on another organ) of the patient, wherein the glove or other gear includes target 210.

According to an embodiment of the invention, object 100 is static, and at least one component of system 200 (and especially optical sensor 240) moves in relation to object 100, wherein processor 220 is adapted to determine a kinetic parameter of system 200 in relation to object 100.

Figure 1B:
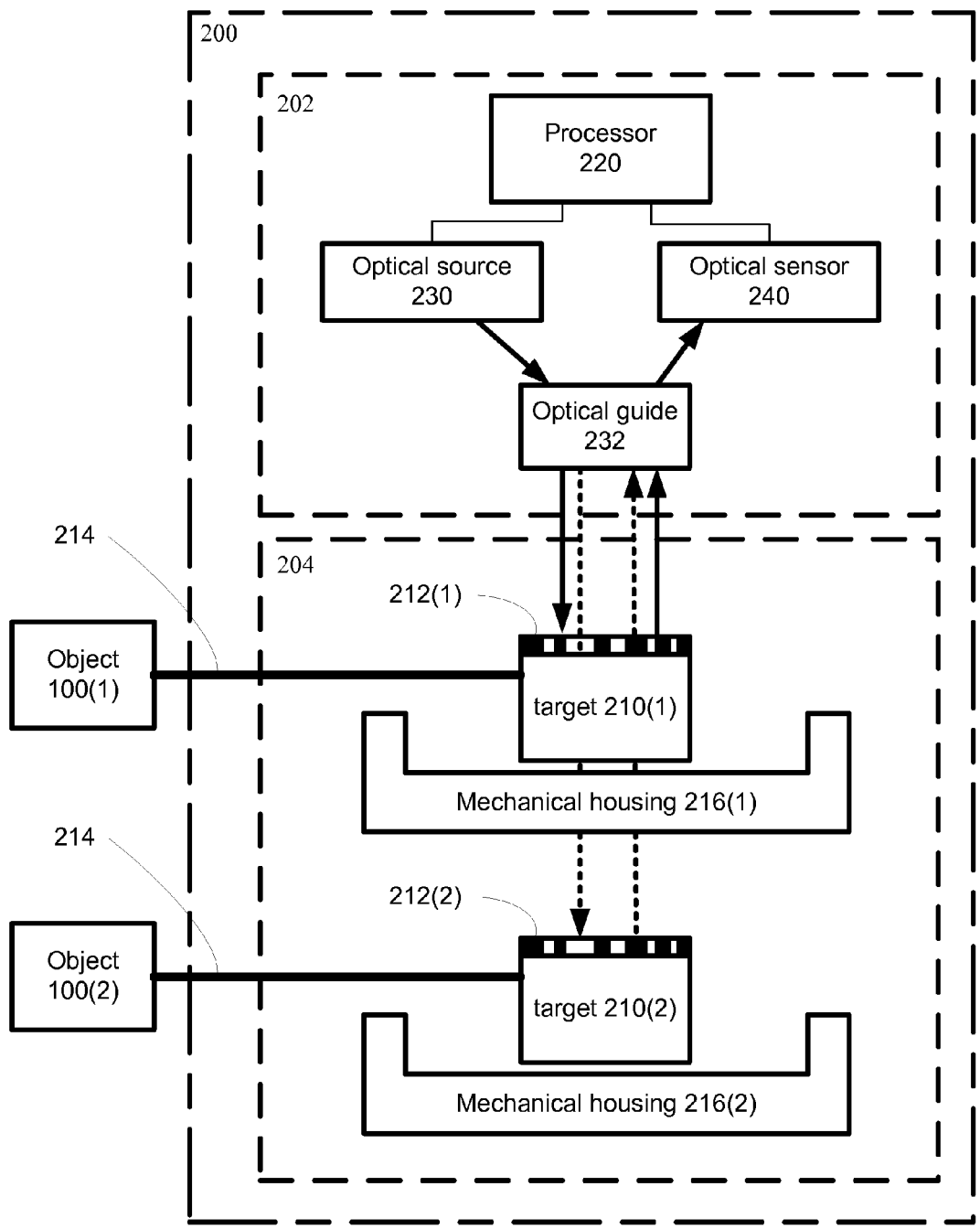
FIG. 1b is a block diagram of a system, which is adapted to determine kinetic parameters of multiple objects, according to an embodiment of the invention.

FIG. 1*b* is a block diagram of a system, which is adapted to determine kinetic parameters of multiple objects, according to an embodiment of the invention. According to an embodiment of the invention, system 200 includes multiple targets 210, wherein each of the targets 210 is connected to an object 100 out of multiple objects 100 and includes a calibration facilitating pattern 212, so that a movement of the target 210 correlates with a movement of the object 210 (e.g. in the illustrated example, the target denoted 210(1) is connected to the object denoted 100(1) and includes calibration facilitating pattern denoted 212(1), so that a movement of the target denoted 210(1) correlates with movement of the object denoted 210(1), and the target denoted 210(2) is connected to the object denoted 100(2) and includes calibration facilitating pattern denoted 212(2), so that a movement of the target denoted 210(2) correlates with movement of the object denoted 210(2)).

According to such an embodiment of the invention, processor 220 (or, according to an embodiment of the invention, multiple processors 220) is adapted to determine a calibration parameter and a kinetic parameter for each of the multiple objects 100 in response to detection signals and to detection signals reference information.

It is noted that according to different such embodiments of the invention, system 200 may includes one or more optical sources 230, each of which is adapted to illuminate one or more targets 210, and/or one or more optical sensors 240, each of which is adapted to generate detection signals in response to light received from one or more targets 210.

It is clear to any person who is skilled in the art that even though in FIG. 1*b* only two targets 210 and two objects 100 are illustrated, according to different embodiments of the invention, system 200 may include larger number of targets 210 that are connected to a larger number of objects 100. It is noted that, according to a different embodiments of the invention, the calibration facilitating patterns 212 of the different targets 210 may be either similar or different from one another. According to an embodiment of the invention, kinetic parameters of several fingers of the patient could be determined by system 200.

Figure 2A:
FIGS. 2a and 2b illustrate a calibration facilitating patterns, according to different embodiments of the invention.
Figure 2A:
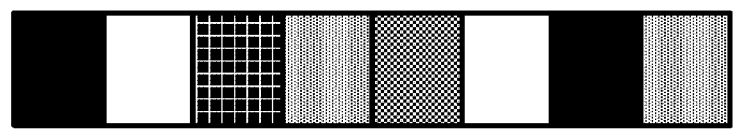
Figure 2B:
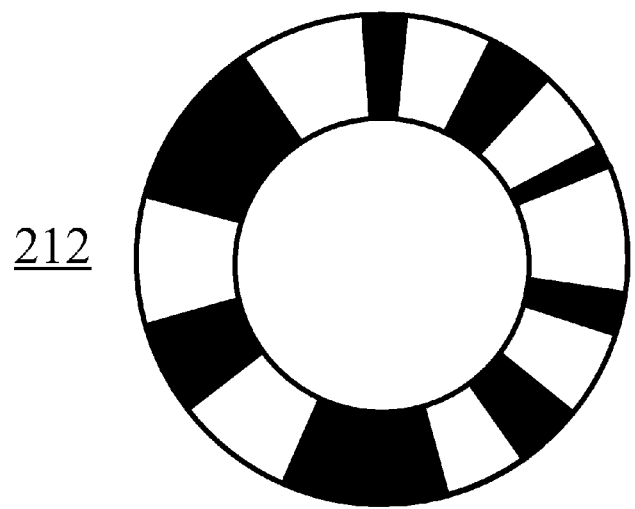

FIGS. 2*a* and 2*b* illustrate calibration facilitating patterns 212, according to different embodiments of the invention, wherein FIG. 2*a* illustrates two versions of a linear calibration facilitating pattern 212, and FIG. 2*b* illustrates a cyclic calibration facilitating pattern 212.

FIGS. 3*a*, 3*b*, 3*c* and 3*d* illustrate different views of system 201, which is adapted to determine kinetic parameters of multiple organs of a subject, and different components thereof, according to an embodiment of the invention. It is noted that conveniently, system 201 is an embodiment of system 200. Conveniently, system 201 is adapted to determine kinetic parameters of multiple fingers of the subject (usually five fingers of a single hand of the subject), and, according to an embodiment of the invention, also to determine a kinetic parameter of a wrist of the subject (which is the wrist of the single hand).

Figure 3A:
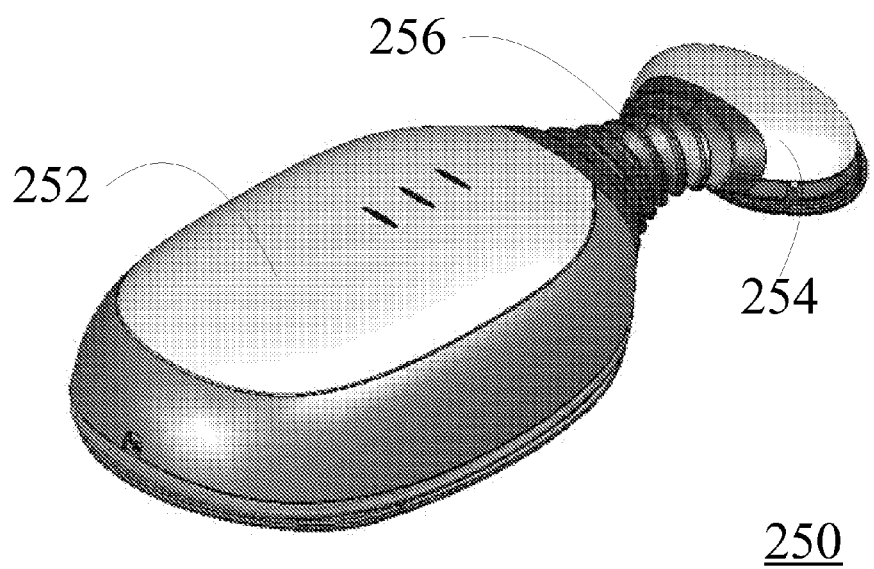
FIGS. 3a, 3b, 3c and 3d illustrate different views of a system, which is adapted to determine kinetic parameters of multiple organs of a subject, and different components thereof, according to an embodiment of the invention.

FIG. 3*a* is an external view of external body 250 of system 201. External body 250 is adapted to fit onto an arm of the user, and includes main mechanical housing 252 for mechanical assembly 204 and optical assembly 202 (not illustrated in FIG. 3*a*, see FIG. 1*a*). external body 250 also includes mechanical connections housing 254 for mechanical connections 214 (not illustrated in FIG. 3*a*), that is connected to main mechanical housing 252 by flexible connector 256, which is conveniently hollow, so as to allow free movement of mechanicals connections 214 through flexible connector 256.

Figure 3B:
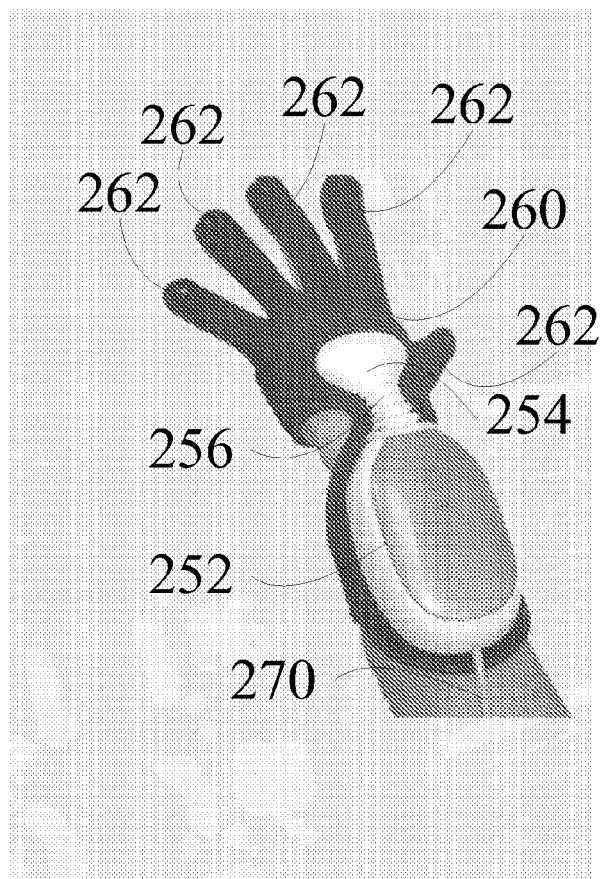

FIG. 3*b* illustrates system 201 as worn by a subject, according to an embodiment of the invention. System 201 further includes glove 260, which includes five mechanical connection trails 262, which house mechanical connections 214 which are connected to the finger sheaths of glove 260. It is noted that, according to an embodiment of the invention, system 201 is further adapted to determine a kinetic parameter of the wrist of the subject, wherein conveniently the mechanical connector 214 that is connected above the wrist is enclosed by external body 250.

Conveniently, system 201 further includes communication cable 270, which is used to transmit and/or to receive information to and/or from external system 900.

Figure 3C:
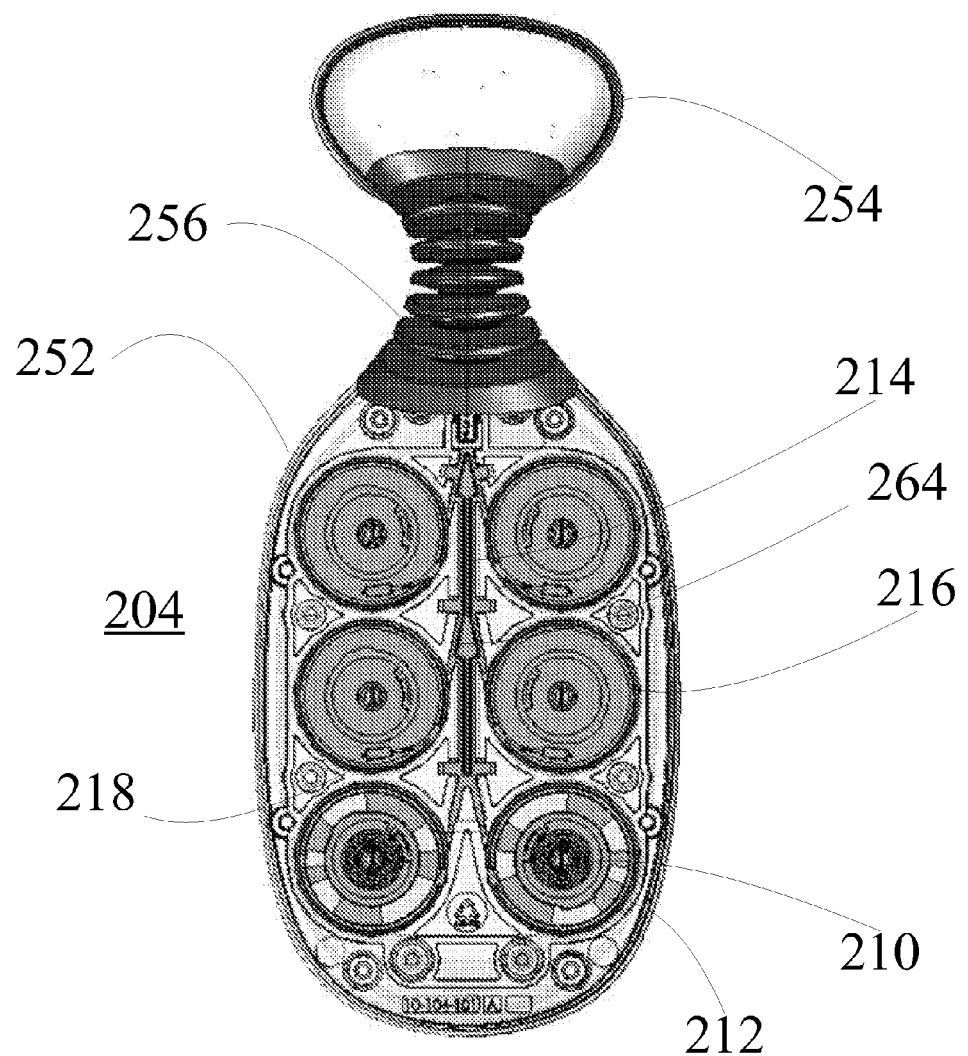
Figure 3D:
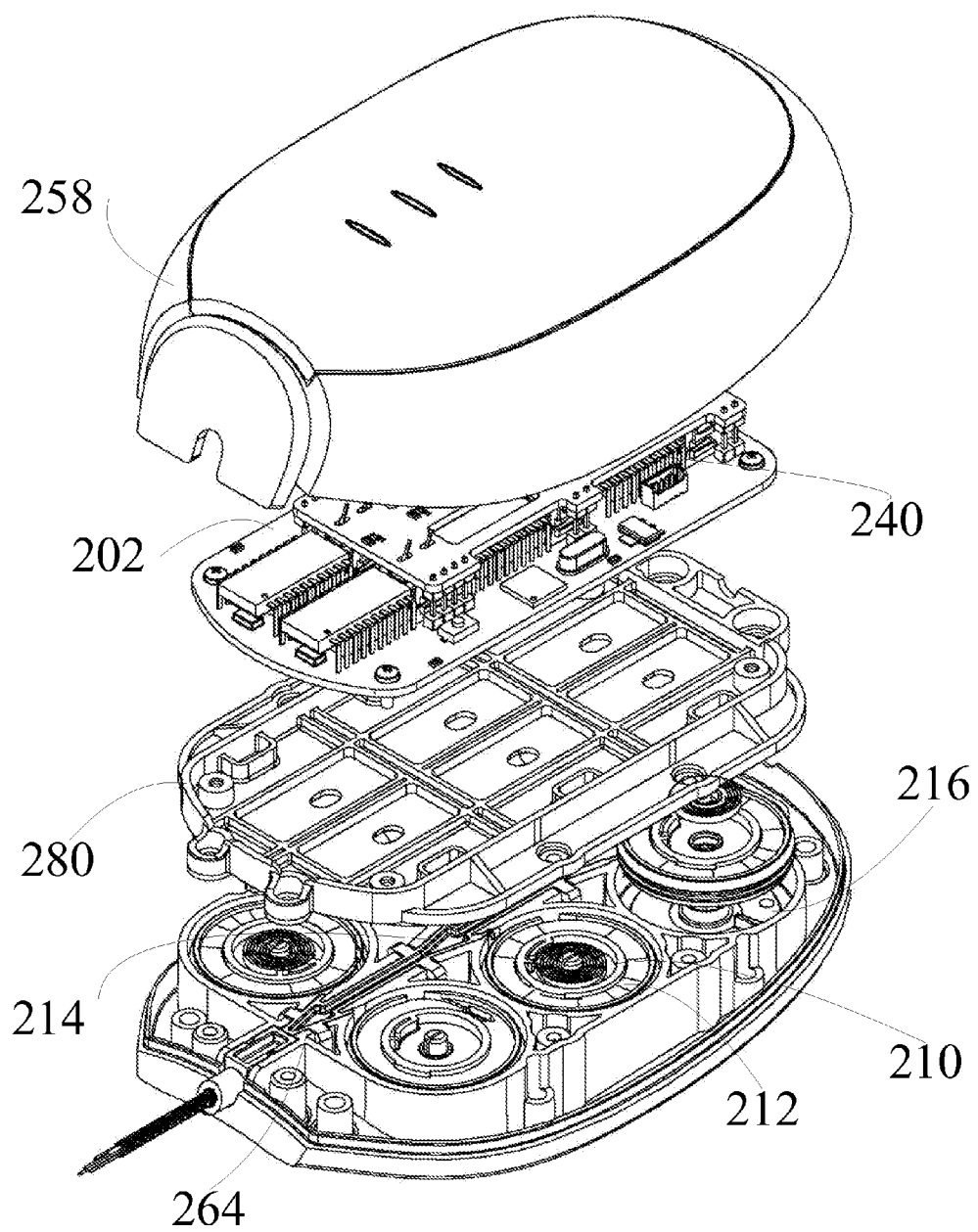

FIG. 3*c* illustrates mechanical assembly 204 of system 201, according to an embodiment of the invention. Mechanical assembly 204 includes, according to the illustrated embodiment of the invention, six targets 210 which are retractable rotatable drums (the calibration facilitating pattern 212 of which is similar to the one illustrated in FIG. 2*b*), which are housed in six matching mechanical housings 216. All six mechanical connections 214 according to the illustrated embodiment of the invention pass through main mechanical connections trail 264. Additionally, each mechanical housing 216 includes retractor 218.

FIG. 3*d* is an exploded view of components of system 201. Optical assembly 202 includes six optical sensors 240, which correspond to the six targets 210. Optical assembly 202 is conveniently supported by optical assembly support 280. Top cover 258 is the top portion of external body 250.

It is noted that in embodiments of system 200 (such as system 201) that include multiple targets 210 (and conveniently also multiple optical sensors 240), the determining of the kinetic parameters of the multiple objects 100 is conveniently carried out simultaneously.

Figure 4A:
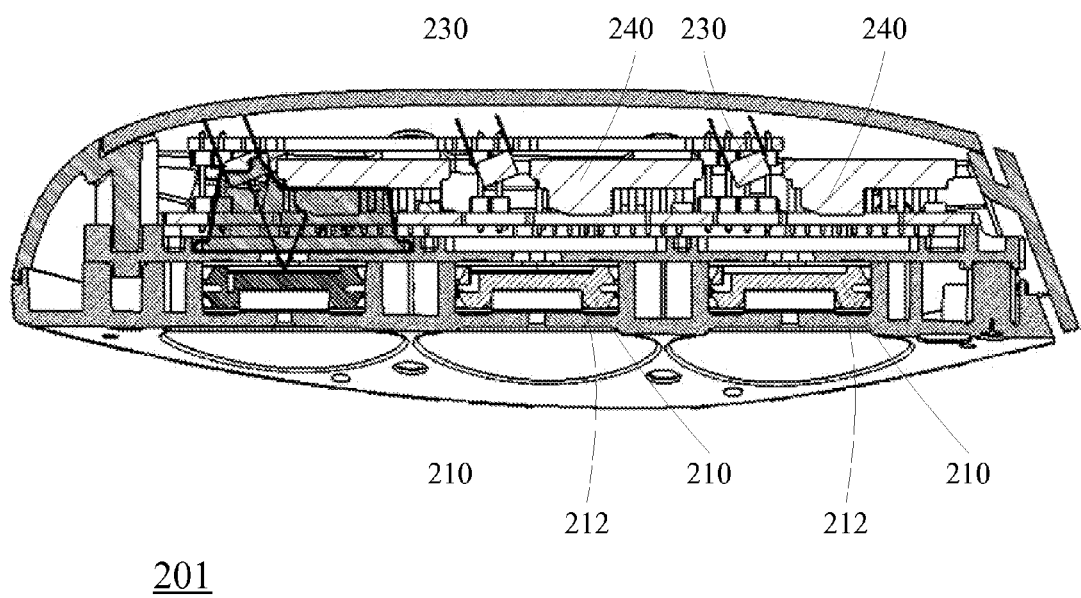
FIGS. 4a and 4b are cross section views of portions of a system, which is adapted to determine kinetic parameters of multiple organs of a subject, and different components thereof, according to an embodiment of the invention.
Figure 4B:
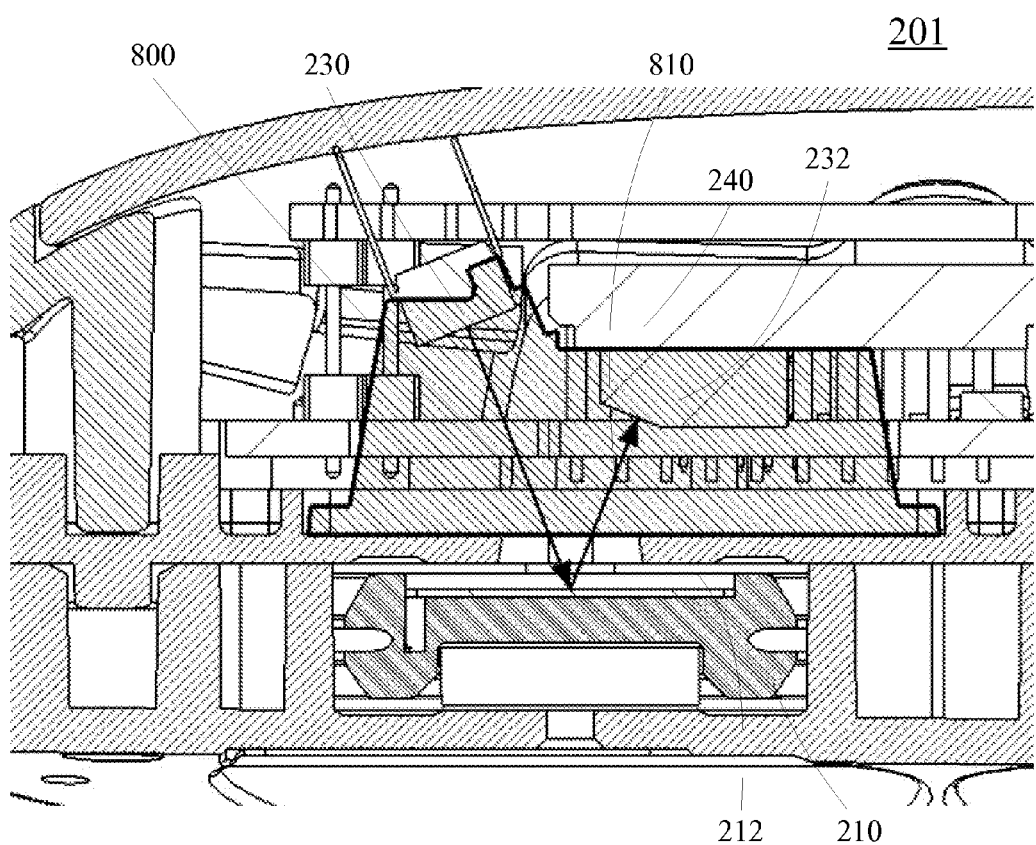

FIGS. 4a and 4b are cross section views of portions of system 201, according to an embodiment of the invention, wherein FIG. 4b is a close up view of the portion illustrated in FIG. 4a. Illustrated in FIGS. 4a and 4b is a track of a laser beam 800 that is projected by optical source 230 onto target 210, and reflected back (denoted 810) from target 210 to optical sensor 240. As aforementioned, according to an embodiment of the invention at least a portion of the illumination of optical source 230 and/or of the light received from target 210 by optical sensor 240 is guided by at least one optical guide 232.

Figure 5:
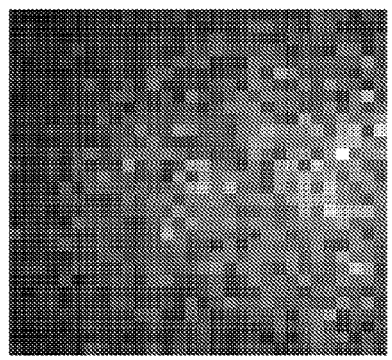
FIG. 5 illustrates four captured images, as captured by an embodiment of the invention.
Figure 5:
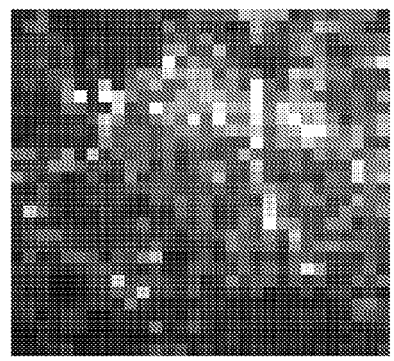
Figure 5:
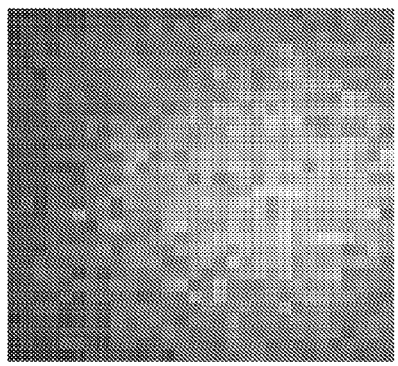
Figure 5:
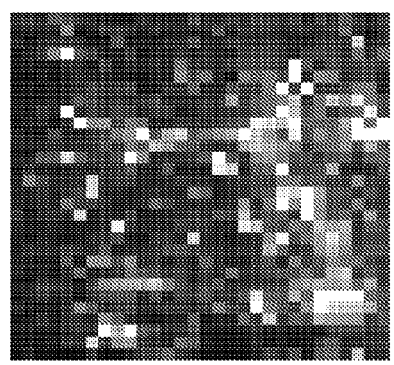

FIG. 5 illustrates four captured images 410, 420, 430, and 440, as captured by an embodiment of the invention. All of captured images 410 through 440 illuminated by the same illumination, and the difference between the received captured images 410 through 440 results entirely from the difference in surface quality of the imaged portion of target 210. It is clear to a person who is skilled in the art that the difference between the captured image suffice for processor 220 to differentiate between different areas of calibration facilitating target 212, and so do determine the kinetic parameter and of the calibration parameter.

It is noted that whereas captured images 410 through 440 were captured using a 64 gray scale degrees optical sensor 240, different optical sensors 240 are implemented in different embodiments of the invention.

According to an embodiment of the invention, the dimensions of calibration facilitating targets 212 are measured in centimeters (so as to fit into a wearable system 200, for example), while the captured area that is captured by optical sensor 240 is, according to an embodiment of the invention, measured in millimeters. Therefore, according to an embodiment of the invention, in most captured images, only a single colored segment is captured. Conveniently, the surface characteristics of the different colored segments are such, that processor 220 is able to measure a movement of calibration facilitating target 212 from the comparison of consecutive captured image of the same colored segment, wherein the transition between colored segments is used for calibration, as disclosed above. The comparison between consecutive images is conveniently carried out by implementing correlation algorithms.

Figure 6:
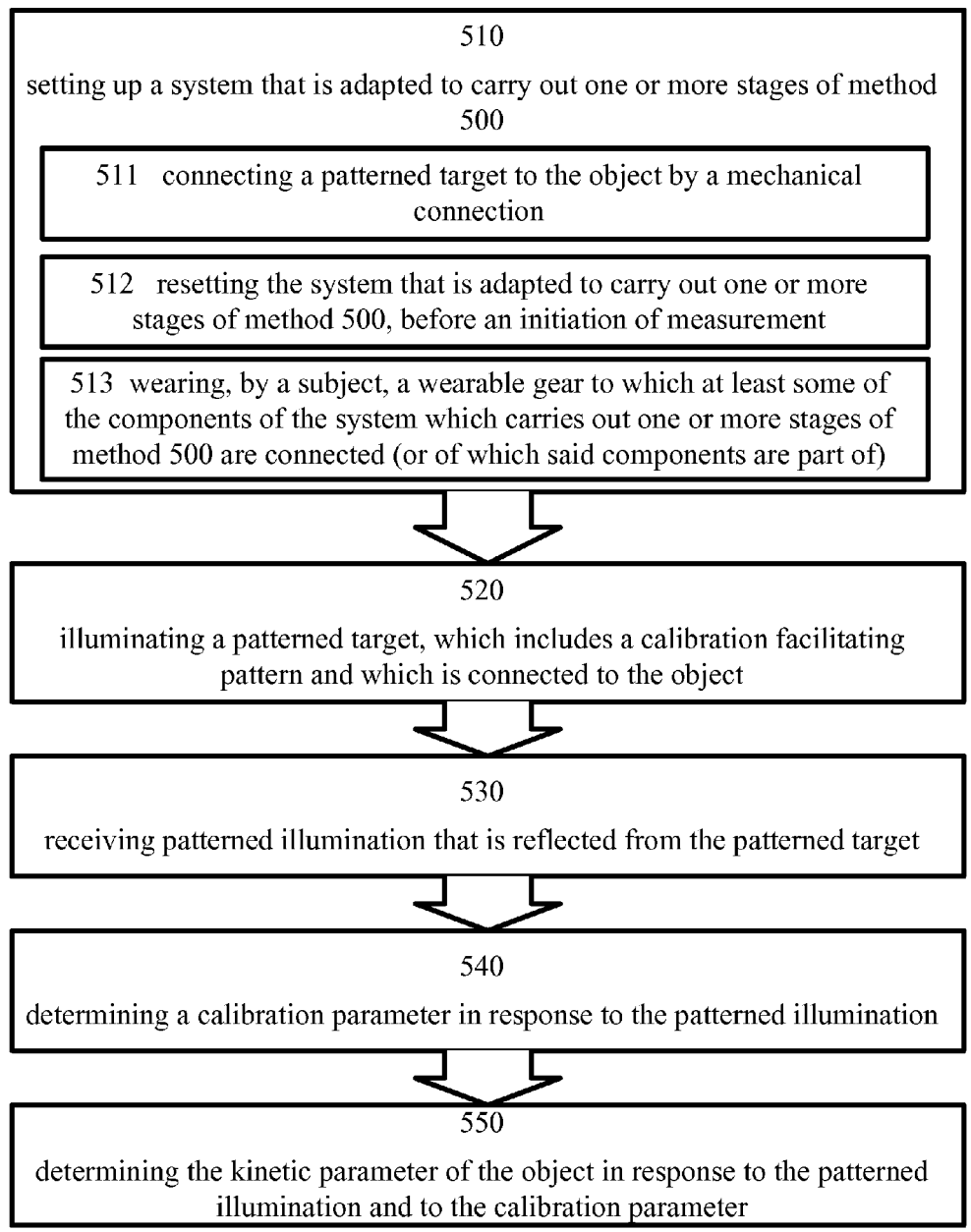
FIG. 6 illustrates a method for determining a kinetic parameter of an object, according to an embodiment of the invention.

FIG. 6 illustrates method 500 for determining a kinetic parameter of an object, According to an embodiment of the invention.

According to an embodiment of the invention, method 500 starts with stage 510 of setting up a system that is adapted to carry out one or more stages of method 500.

According to an embodiment of the invention, stage 510 includes stage 511 of connecting a target to the object by a mechanical connection, which includes, according to some different embodiments of the invention, strings, bearings, and some plastic elements that are responsible for transferring any motion of the object to the target. It is noted that the mechanical connection facilitates a connecting of a remote object to the target, and that the distance between the object and the target differ between different embodiments of the invention.

According to an embodiment of the invention, stage 510 includes stage 512 of resetting the system that is adapted to carry out one or more stages of method 500, before an initiation of measurement. Conveniently, stage 512 includes zeroizing a calibration parameter, wherein an accumulated error of measurement which is the determining is conveniently determined from the zeroizing onwards. It is noted that, according to an embodiment of the invention, neither resetting nor a zeroizing of the system is needed.

According to an embodiment of the invention, stage 510 includes stage 513 of wearing, by a subject, a wearable gear to which at least some of the components of the system which carries out one or more stages of method 500 are connected to (or of which said components are part of), wherein at least one stage of the method is carried out by a component that is connected to, or included in, the wearable gear.

According to an embodiment of the invention, the wearing includes wearing a glove, to which at least some of the components of the system which carries out one or more stages of method 500 are connected to (or of which said components are part of). According to an embodiment of the invention, the wearing includes wearing a gear adapted to be worn on an upper arm of the patient, to which at least some of the components of the system which carries out one or more stages of method 500 are connected to (or of which said components are part of), wherein the one or more mechanical connections are adapted to transfer the motion of one or more fingers of the patient, wherein the patient is provided with one or more finger gears, connected to the one or more mechanical connections. According to an embodiment of the invention, the wearing includes wearing a data-sleeve, According to an embodiment of the invention, the system which carries out one or more stages of method 500 includes a data-sleeve (or other wearable gear) to which at least some of the components of the system are connected to (or of which said components are part of) used for precise measurement of the motions of the body parts such as the neck, or feet.

Method 500 continues with stage 520 of illuminating a target, which includes a calibration facilitating pattern and which is connected to the object, so that a movement of the target correlates with a movement of the object, wherein, the illuminating of the target includes illuminating at least a portion of the calibration facilitating pattern. Referring to the examples set forward in the previous drawings, the illuminating is conveniently carried out by optical source 230.

The calibration facilitating pattern conveniently includes multiple segments, so that when given detection signals responsive to the calibration facilitating target, a determining of the kinetic parameter as well as calibration of the measurement (by determining one or more calibration parameters) could be carried out.

It is noted that the target is conveniently assembled in a mechanical assembly, which includes, according to an embodiment of the invention, a well defined track which is adapted to confine the movement of the target to a predefined course. The motion of the object which is transferred via the mechanical connection to the target thus results in a motion of the calibration facilitating pattern which corresponds to the motion of the object.

It is noted that, according to an embodiment of the invention, the illuminating includes illuminating the target with a laser beam. According to an embodiment of the invention, the illuminating includes illuminating by a light emitting diode (LED). It will be clear to a person skilled in the art that the illuminating could be carried out by additional types of optical sources in different embodiments of the invention.

It is noted that, according to an embodiment of the invention, stage 520 includes guiding at least a portion of the illumination of stage 520 by at least one optical guide. According to an embodiment of the invention, the optical guide includes optical components such as a converging lens. Conveniently, all the optical components are adapted for a specific spectral range, e.g. a portion of the infrared spectrum.

According to an embodiment of the invention, the illuminating includes illuminating the calibration facilitating pattern which includes multiple differently colored segments of different dimensions (e.g. widths, areas, and so forth), and wherein a determining is responsive to the dimensions of the differently colored segments. It is noted that examples of such calibration facilitating patterns are illustrated in FIGS. 2a and 2b.

Conveniently, the calibration facilitating pattern includes multiple differently colored segments of different dimensions (e.g. widths, areas, and so forth), wherein the differently colored segments reflect illumination differently, either by the amount of light reflected, or by otherwise having different reflection characteristics. The motion of the object transferred to the target results in a movement of the calibration facilitation pattern, and thus to a shifting in locations of boundaries between the multiple differently colored segments. Conveniently, the multiple differently colored segments are designed so that the shifting of the boundaries, when processed during at the determining, suffices for the determining of the kinetic parameter and of the calibration parameter. That is, the determining of at least one of the kinetic parameter and of the calibration parameter is conveniently responsive to the dimensions (e.g. widths) of the differently colored segments, in such as embodiment of the invention. It is noted that in different embodiments of the invention, different calibration facilitating patterns are implement, some of which includes differentiation of the pattern over multiple axes.

It is clear to a person skilled in the art that the target could be implemented in various ways. According to an embodiment of the invention, the illuminating includes illuminating the target that is a rotating target. Conveniently, the rotating target is adapted to be rotated continuously (e.g. having a shape of a wheel, or a rotatable drum), and so to facilitate measuring a motion of the object over a relatively long distance, while the size of the target is relatively small. According to such an embodiment of the invention, the calibration facilitating pattern is conveniently a cyclic pattern, i.e. covering an entire perimeter of the rotating target. It is noted that an example of a cyclic calibration facilitating pattern is illustrated in FIG. 2b.

It is noted that in such as embodiment of the invention, a linear (translational) motion of the object is conveniently converted into a circular motion of the rotating target. It is clear to any person skilled in the art that while the generating conveniently includes generating two dimensional images that are used in the determining, the different parameters are determinable from the two dimensional representation of the curved (e.g. round) target.

Conveniently, the optical sensor acts as linear sensor in the sense that it interprets linear and circular pattern in exactly the same manner. Therefore, the calibration facilitating pattern of the curved target is conveniently sensed by the optical sensor linearly during the generating. It is noted that, conveniently, the calibration facilitating pattern of the curved target is designed to facilitate such generating of the detection signals.

According to an embodiment of the invention, the two dimensional nature of the image is used for measuring two orthogonal motions; for example, in the case of a linear calibration facilitating pattern, both x and y displacements are measured, wherein the same can be applied to the curved pattern.

According to an embodiment of the invention, the illuminating includes illuminating a target that is a sliding target. Conveniently, the target is adapted to slide along a well defined track. Conveniently, the track facilitates linear sliding of the sliding target, though sliding along a curved track is implemented in some embodiments of the invention. According to such an embodiment of the invention, the target is a piston, which is conveniently adapted to extend and retract over a predetermined track.

According to an embodiment of the invention, the illuminating includes illuminating a target that is attached to the object. For example, the wearable gear or the glove aforementioned may include the target.

It is noted that, according to an embodiment of the invention, method 500 further includes retracting the target. The retracting can conveniently include either retracting the target to a starting position, or just applying a force countering a force applied by the object. It is noted that in such an embodiment of the invention, at least one of the stages determining is conveniently responsive to the force applied during the retracting.

Conveniently, the illuminating includes illuminating with sufficient intensity for the generating of detection signals responsive to the light reflected from the calibration facilitating pattern to a degree which facilitate the determining, discussed below.

Stage 520 is followed by stage 530 of generating detection signals in response to light received from the target. Referring to the examples set forward in the previous drawings, stage 530 is conveniently carried out by optical sensor 240. Conveniently, the generating is responsive to light received from at least a portion of the target, wherein at least a portion of the light received from the target is light illuminated onto the target during the illuminating, and reflected from the calibration facilitating pattern. According to an embodiment of the invention, the generating includes receiving light by a charge coupled device (CCD) or by a suitable photodiode. Conveniently, the generating includes generating a series of consecutive images of an area which includes at least a portion of the target that includes at least a portion of the calibration facilitating pattern. Conveniently, the generating includes providing the detection signals (such as the consecutive images) to a processor that is adapted to carry out the stage of determining.

It is noted that, according to an embodiment of the invention, stage 530 includes guiding at least a portion of the patterned illumination by at least one optical guide. According to an embodiment of the invention, the optical guide includes optical components such as a converging lens. Conveniently, all the optical components are adapted for a specific spectral range, e.g. infrared radiation or a portion of the infrared spectrum. It is noted that conveniently, at least one optical guide facilitates the keeping of the target (and especially of the calibration facilitating pattern) in dark, except from when illuminated by the optical source.

Stage 530 is followed by stage 540 of determining the calibration parameter and the kinetic parameter in response to the detection signals and to detection signals reference information. Conveniently, the determining includes determining the calibration parameter in response to the detection signals and in response to detection signals reference information, and determining the kinetic parameter of the object in response to the detection signals and to the calibration parameter. Referring to the examples set forward in the previous drawings, stage 540 is conveniently carried out by processor 220

It is noted that, conveniently, the determining of the calibration parameter, and conveniently also of the kinetic parameter, is response to stored detection signals reference information which is conveniently information of the calibration facilitating pattern. According to an embodiment of the invention, stage 540 includes stage 541 of comparing a series of images acquired during the generating to the detection signals reference information, wherein the determining of the calibration parameter, and according to an embodiment of the invention the determining of the kinetic parameter as well, is responsive to the results of the comparing.

It is noted that according to different embodiments of the invention, different kinetic parameters could be determined, and that according to an embodiment of the invention, the determining includes determining multiple kinetic parameters. Such kinetic parameters include, for example, a location of the object, a velocity of the object, a direction of the movement of the object, a velocity of the object along an axis (which may be defined in relation to the object, to the system that carries out one or more stages of method 500, or to another object), among other parameters familiar to a person skilled in the art.

It is noted that in systems which determine a kinetic parameter of an object in response to a shifting of a target (such systems are, for example, optical navigation systems, inertial navigation systems, etc.) it is common for accumulative errors to accrue during a span of the measurement. Method 500 is adapted to compensate for such accumulative errors by having the determining of the kinetic parameter responsive to one or more determined calibration parameters, which is facilitated by the inclusion of the calibration facilitating pattern in method 500. According to an embodiment of the invention, the calibration parameter is a measure of the accumulative error, which accrued during a span of the measurement.

Conveniently, the determining of the kinetic parameter (and, according to an embodiment of the invention, also of the calibration parameter) includes comparing between successive captured images (or other detection signals), that facilitates detection and quantification of any movement of the calibration facilitating pattern and consequently of the object.

It is clear to a person skilled in the art that different kinetic parameters may be determined from such a comparison of the successive captured image. However, such a process inherently involves errors and inaccuracies, which typically accumulate over a span of a measurement. In order to determine a location of the object, for example, the determining needs to be responsive to one or more calibration parameters which are conveniently measures of accumulated error.

According to an embodiment of the invention, the determining includes determining a kinetic parameter of an organ of a subject, which is usually a human patient. Different physiological phenomena, such as different types of tremor, involve movement (usually involuntary), such as trembling. The determination of kinetic parameters pertaining to movements caused by such physiological phenomena may facilitate the recognition, identification and/or treatment such physiological phenomena or diseases.

For example, different sorts of tremor—an unintentional oscillatory muscle movement of one or more parts of the body—are better recognized, identified and treated by an accurate measurement of the kinetic parameters of the tremor. It is noted that the common tremors affect the hands, arms, head, face, torso, and legs, from which the most common is the hand tremor.

It is noted that method 500 can be used to measure both intentional and unintentional movement of one or more organs of the patient, and that such intentional and unintentional movements can occur (and thus also measured) simultaneously.

According to an embodiment of the invention, the determining includes determining in relation to the object a kinetic parameter of a system that is adapted to carry out at least one stage of method 500, wherein the object is static.

According to an embodiment of the invention, method 500 further includes providing the kinetic parameter to an external system such as a personal computer, a personal digital assistant, a cellular phone, and so forth. According to an embodiment of the invention, method 500 includes providing the calibration parameters to an external system.

It is noted that, conveniently, the external system is adapted to display, to record or to otherwise use the kinetic parameter (and, according to an embodiment of the invention, also the calibration parameter) in a continuous fashion, continuously using updated values of the one or more parameters received during the providing of the kinetic parameter and/or of the calibration parameter.

According to different embodiments of the invention, the connection between the system and the external system is wireless, wired, or a combination thereof.

It is noted that, according to an embodiment of the invention, the determining of at least one of the calibration parameter and of the kinetic parameter is carried out by the processor which is a processor of a system such as a computer, wherein the generating conveniently includes providing, by an optical sensor which carries out the generating, to the processor the detection signals via an interface of said system, which is conventionally a standard interface (like a universal serial bus and the like). It is noted that according to different embodiments of the invention, the providing of the signal is carried out over either a wireless or a wired channel.

According to an embodiment of the invention, the illuminating includes illuminating multiples targets, wherein each of the targets is connected to an object out of multiple objects and includes a calibration facilitating pattern, so that a movement of the target correlates with a movement of the object; and wherein the determining includes determining a calibration parameter and a kinetic parameter for each of the multiple objects in response to detection signals and to detection signals reference information.

According to an embodiment of the invention, the object is a finger of the patient, wherein it is noted that according to an embodiment of the invention, the determining includes determining kinetic parameters of several fingers of the patient.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

We claim:

1. A system for determining a kinetic parameter of an object, the system comprises:
   a target, that comprises a calibration facilitating pattern and which is coupled to the object, so that a movement of the target correlates with a movement of the object; wherein the calibration facilitating pattern comprises multiple differently colored segments that are delimited by boundaries;
   an optical source, which is adapted to illuminate the target;

an optical sensor, adapted to generate detection signals in response to light received from the target; wherein the detection signals form images of the target; and a processor, adapted to determine a calibration parameter and the kinetic parameter in response to the detection signals that are indicative of a shift of at least one boundary between different images of the target and to detection signals reference information; wherein the calibration parameter is a measure of an accumulative error which accrued during a span of a measurement of the kinetic parameter of the object.

2. The system according to claim 1, wherein the object is an organ of a subject and wherein the target is arranged to be move along a predefined course and wherein the target is coupled to organ to facilitate a conversion of a linear movement of the organ to a circular movement of the target about an axis of the target.

3. The system according to claim 1, wherein the multiple differently colored segments are of different dimensions, and wherein a determining of the processor is responsive to the dimensions of the differently colored segments.

4. The system according to claim 1, wherein the differently color segments differ from each other by amount of light they reflect.

5. The system according to claim 1, comprising multiple targets, each target being a retractable rotatable drum wherein the multiple targets are coupled to multiple organs of a subject.

6. The system according to claim 1, comprising multiple targets, each target being a sliding target arranged to slide along a linear track.

7. The system according to claim 1, further comprising a retractor, which is adapted to retract the target.

8. The system according to claim 1, comprising multiple targets that are coupled to organs of a person and wherein the processor is arranged to track tremors of the person.

9. The system according to claim 1, comprising multiple targets that are arranged to be coupled to multiple fingers of a person and wherein the multiple targets are arranged to rotate about their axes in response to a linear or circular movement of at least one of the multiple fingers.

10. The system according to claim 1, wherein the target is adapted to be rotated continuously and facilitate a measurement of a motion of the object over distance that exceeds a size of the target.

11. The system according to claim 1, comprising multiple targets, each target is arranged to rotate about an axis of the target in response to a linear movement of a finger of a subject; wherein the multiple targets are located within a housing that is coupled to a glove and wherein the multiple targets are coupled to fingers of the subject via mechanical connections positioned within mechanical connection trails of the glove.

* * * * *